United States Patent [19]
Li

[11] Patent Number: 6,080,595
[45] Date of Patent: Jun. 27, 2000

[54] METHOD FOR ESTIMATING THE THICKNESS OF LAYER COATED ON WAFER

[75] Inventor: Kim Li, Hsinchu, Taiwan

[73] Assignee: Mosel Vitelic Inc., Hsinchu, Taiwan

[21] Appl. No.: 09/252,940

[22] Filed: Feb. 19, 1999

[30]     Foreign Application Priority Data

Nov. 10, 1998  [TW]   Taiwan ................................. 87118711

[51] Int. Cl.$^7$ .......................... G01R 31/26; H01C 21/66
[52] U.S. Cl. .................................. 438/14; 438/15; 438/17
[58] Field of Search ................................ 438/14, 15, 17, 438/18

[56]           References Cited
          U.S. PATENT DOCUMENTS 4,497,108   2/1985   Kurosawa .
5,223,080   6/1993   Ohta et al. .
5,949,927   9/1999   Tang .

*Primary Examiner*—Kevin M. Picardat
*Assistant Examiner*—D. M. Collins
*Attorney, Agent, or Firm*—Miles & Stockbridge P.C.; William L. Feeney

[57]              ABSTRACT

A method for estimating the thickness of a desired layer coated on a wafer includes steps of (a) forming a plurality of compared layers having the same composition of the desired layer, (b) measuring the thickness of each of the plurality of compared layers, (c) estimating a factor affecting the thickness due to a solid content in the plurality of compared layers according to the thickness of the plurality of compared layers, and (d) calculating the thickness of the desired layer coated on the wafer by introducing the factor. The desired layer is a photoresist layer formed by a spin coater. The plurality of compared layers in the step (a) are formed at different spinning rates of the spin coater. The factor is estimated by a linear regression method, and the linear regression method is used to obtain an equation representing the relation between the thickness of the plurality of compared layers and each corresponding spinning rate. The equation is $$w = \frac{A}{t^2} + B$$

where w is the each spinning rate, t is the thickness of each compared layer, A is a constant, and B is the factor.

18 Claims, 1 Drawing Sheet

METHOD FOR ESTIMATING THE THICKNESS OF LAYER COATED ON WAFER

FIELD OF THE INVENTION

The present invention relates to a method for estimating the thickness of a desired layer coated on a wafer, more particularly to a method for estimating the thickness of a photoresist layer on a wafer.

BACKGROUND OF THE INVENTION

Usually, it needs several spin coating steps for fabricating a multilevel integrated circuit in a semiconductor manufacturing process. The theory of a spin coating process is to spray a liquid material on the surface of a spinning wafer and allow the liquid material to spread over the wafer evenly by the centrifugal force. After drying, a layer with an uniform thickness is formed on the surface of the wafer. Almost all the photoresist layers are formed by this kind of spin coating process now. The result of the sequential photolithographic process will be influence by the uniformity of the photoresist layer. If the thickness of the photoresist layer is not uniform, the quality of the transferred pattern is poor. This can cause a short circuit after several photolithographic steps. A photoresist layer without any defect can be made in the spin coating step; therefore, the spin coating step is very important in the semiconductor manufacturing process.

The thickness of the photoresist layer is related to the resolution of the photolithography. The photoresist layer becomes thinner, the resolution becomes higher. However, in another aspect of view, a thick photoresist layer has a better etch resistance and few contaminants. Therefore, the thickness of the photoresist layer should be controlled in a proper range. There are many parameters determining the thickness of a photoresist layer and the most important one is the spinning rate of the spin coater. The equation used for calculating the thickness of a photoresist layer is:

$$t = \frac{kS^2}{\sqrt{w}} \quad (1)$$

where t is the thickness of the photoresist layer, k is a factor varied along with the viscosity of the liquid material, S is the solid content in the photoresist layer, and w is the spinning rate of the coater.

If several wafers are coated by the same liquid material, k becomes a constant but S would be varied according to the different thickness of the photoresist layers. Although the range of different thickness are not very large, the required quality of the semiconductor device is very high now and it is impossible to ignore this variation of S.

Now, k and S are still viewed as constants when calculating the thickness of a photoresist layer; therefore, $$t \propto \frac{1}{\sqrt{w}} \quad (2)$$

By a specific spinning rate of the spin coater and its corresponding thickness of the photoresist layer, we can estimate another thickness of a photoresist layer formed by another specific spinning rate or estimate another spinning rate used to form another specific thickness of photoresist layer. The equation for calculating the thickness of the photoresist layer or the spinning rate of the coater is:

$$w_2 = w_1 \left(\frac{t_1}{t_2}\right)^2 \text{ or } t_2 = t_1 \sqrt{\frac{w_1}{w_2}} \quad (3)$$

Because S is viewed as a constant, the error of the calculated thickness or the spinning rate is small only when the thickness of two photoresist layers are very similar. If the difference between each thickness of two photoresist layers become large, the error of calculating an unknown thickness of the photoresist layer by equation (3) can not be ignored. Therefore, it is tried by the applicant to deal with the problem encountered with the prior art.

SUMMARY OF THE INVENTION

An object of the present invention is to provide a method for estimating the thickness of a desired layer coated on a wafer.

Another object of the present invention is to provide a method for estimating the thickness of a photoresist layer in a semiconductor manufacturing process.

According to the present invention, the method includes steps of (a) forming a plurality of compared layers having the same composition of the desired layer, (b) measuring the thickness of each of the plurality of compared layers, (c) estimating a factor affecting the thickness due to a solid content in the plurality of compared layers according to the thickness of the plurality of compared layers, and (d) calculating the thickness of the desired layer coated on the wafer by introducing the factor. The desired layer is a photoresist layer formed by a spin coater.

In accordance with one aspect of the present invention, the plurality of compared layers in the step (a) are formed at different spinning rates of the spin coater.

In accordance with another aspect of the present invention, the factor is estimated by a linear regression method. The linear regression method is used to obtain an equation representing the relation between the thickness of a plurality of compared layers and each corresponding spinning rate. The equation is $$w = \frac{A}{t^2} + B$$

where w is the each spinning rate, t is the thickness of each compared layer, A is a constant, and B is the factor.

In accordance with another aspect of the present invention, the thickness of the desired layer is calculated by the equation. The spinning rates are preferably ranged from 2000 rpm to 7000 rpm and the thickness of the desired layer are preferably ranged from 0.5 μm to 2.0 μm. The error in estimating the spinning rate or the thickness of the desired layer by the equation is less than 1%.

In accordance with another aspect of the present invention, before the step (a), this method further includes a step (a1) of treating the surfaces of the wafers to allow the wafers to have the same surface condition.

The present invention may best be understood through the following description with reference to the accompanying drawings, in which:

DETAILED DESCRIPTION OF THE PREFERRED EMBODIMENTS

Figure 1:
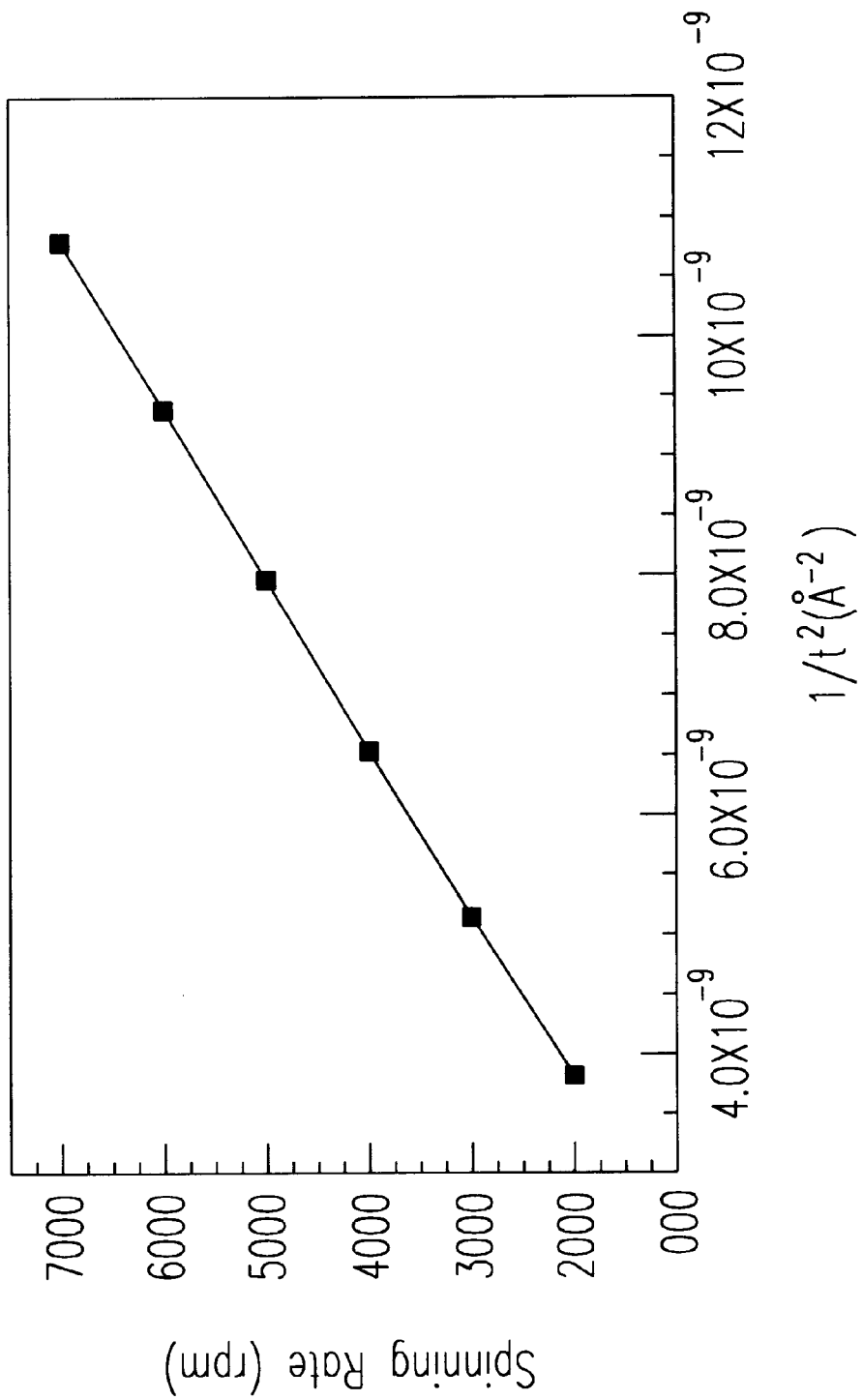
FIG. 1 is a plot showing the relationship between the spinning rate of the spin coater and the thickness of photoresist layer.

In order to calculate the thickness of a photoresist layer quickly and precisely, an equation is proposed now. To understand the influence of the solid content on the thickness of the photoresist layer, several compared photoresist layers made of the same liquid material are formed on several wafers at different spinning rates of the spin coater. In addition, there is a pre-reaction applied on these wafers before the coating process. The reaction is used for treating the surfaces of the wafers to allow the wafers having the same surface properties, and thus no other variation of the wafer will influence the result of the experiment.

Thereafter, the thickness of each photoresist layer is measured, a lot of spinning rates of the spin coater and their corresponding thickness of the photoresist layers are recorded, and an equation can be deduced from these data. The most important concept of the present invention is that the influence of the solid content on the thickness of the photoresist layer can not be neglected. Because this equation is obtained from a large amount of data, the error caused by the solid content can be reduced.

In a preferred embodiment of the present invention, the inventor provides a simple method to obtain this equation by a linear regression method. Before applying the linear regression method, a conversion of the original data must be made. Because the regression equation of the thickness (t) and the spinning rate (w) is a multi-dimensional equation, rather than a one-dimensional equation. The error of the multi-dimensional equation is still too large and can not be ignored. Therefore, Eq. (1) should be converted into Eq. (4):

$$w = \frac{k^2 S^4}{t^2} \quad (4)$$

The linear regression equation of w and $$\frac{1}{t^2}$$

is:

$$w = \frac{A}{t^2} + B \quad (5)$$

There are two constants in Eq. (5), that is, B is the factor of the solid content in the photoresist layer and A is the factor of the liquid material of the photoresist layer. The error of the thickness of the photoresist layer calculated by this equation can be minimized. A high dimensional equation is not obtained directly from the thickness (t) and the spinning rate (W). Insted $$\frac{1}{t^2}$$

is viewed as a parameter and a one-dimensional relationship between w and $$\frac{1}{t^2}$$

is obtained. Because Eq. (5) is directly derived from the original Eq. (1), Eq (5) represents the precise relationship between the thickness of the photoresist layer and the spinning rate of the spin coater. The error caused by the solid content can be eliminated if the equation for calculating the thickness of the photoresit layer obtained from a large amount of data. The range of the thickness calculated by this equation is much larger than that of the prior art.

This equation is not only used for calculating the thickness of the photoresist layer formed at a specific spinning rate but also for calculatuina spinning rate used to form a specific thickness of the photoresist layer.

In order to prove the practicability of Eq. (5), a liquid material "Sumitomo PFI66-B2" is used to be tested. The results are shown in Table 1

TABLE 1

| spinning rate of the spin coater (w) (rpm) | thickness of the photoresist layer (t) (Å) | $\frac{1}{t^2}(\text{Å}^{-2})$ |
|---|---|---|
| 7000 | 9658 | $1.072 \times 10^{-8}$ |
| 6000 | 10365 | $9.301 \times 10^{-9}$ |
| 5000 | 11249 | $7.903 \times 10^{-9}$ |
| 4000 | 12411 | $6.492 \times 10^{-9}$ |
| 3000 | 13994 | $5.106 \times 10^{-9}$ |
| 2000 | 16167 | $3.825 \times 10^{-9}$ | the linear regression graph of the results in Table 1 is shown in FIG. 1. in this linear regression equation $$w = A \times \left(\frac{1}{t^2}\right) + B,$$

the slope (A) is $7.216 \times 10^{-11}$ and the intercept (B) is $-714$. Therefore, as the spinning rate is higher, the error caused by the factor of the solid content (B) is more apparent.

The coparison of the thickness of the photoresist layer estimated by the method described in the present invention and that in the prior art the Table 2.

TABLE 2

| thickness of the photo-resist layer (t) (Å) | actual rate spinning rate of the spin coater (w) (rpm) | method of the present invention spinning reate of the spin coater (w) (rpm) | error (%) | method of The prior art spinning rate of the spin coater (w) (rpm) | error (%) |
|---|---|---|---|---|---|
| 9658 | 7000 | 7022 | 0.31 | 6910 | 1.29 |
| 10365 | 6000 | 6003 | 0.05 | 6077 | 1.29 |
| 11249 | 5000 | 4989 | 0.22 | 5094 | 1.88 |
| 12411 | 4000 | 3970 | 0.75 | 4107 | 2.60 |
| 13994 | 3000 | 2970 | 1.00 | 3716 | 4.87 |
| 16167 | 2000 | 2046 | 2.30 | 2248 | 12.4 |

According to Table 2, when the spinning rates are ranged from 2000 rpm to 7000 rpm, the error of the thickness of the photoresist layer calculated by this equation is very small. Therefore, according to the present invention, the precision of the method is high and the used range of the spinning rates is greater than that of the prior art. Similarly, the poor. This can cause a short circuit after several photolithographic steps. range of the thickness of the photoresist layers in the present invention is also greater than that in the prior art.

The spin coating method is not only used to form a photoresist layer on a wafer but also applied in several applications such as the method for forming a spin-on glass as a silicon dioxide layer. Therefore, the method described in the present invention is not limited in calculating the thickness of the photoresist layer. Generally, the method of the present invention can be used for calculating the thickness of any layer coated by a coating process.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for estimating the thickness of a desired layer coated on a wafer comprising steps of:
    (a) forming a plurality of compared layers having the same composition of said desired layer;
    (b) measuring the thickness of each of said plurality of compared layers;
    (c) estimating a factor affecting said thickness due to a solid content in said compared layers according to said thickness of said plurality of compared layers; and
    (d) calculating said thickness of said desired layer coated on said wafer by introducing said factor.

2. The method according to claim 1 wherein said desired layer is a photoresist layer.

3. The method according to claim 1 wherein said desired layer is formed by a spin coater.

4. The method according to claim 1 wherein said plurality of compared layers in said step (a) are formed at different spinning rates of said spin coater.

5. The method according to claim 4 wherein said factor is estimated by a linear regression method.

6. The method according to claim 5 wherein said linear regression method is used to obtain an equation representing the relation between said thickness of said plurality of compared layers and each corresponding spinning rate.

7. The method according to claim 6 wherein said equation is $$w = \frac{A}{t^2} + B$$

where w is said each spinning rate, t is said thickness of said each compared layer, A is a constant, and B is said factor.

8. The method according to claim 7 wherein said thickness of said desired layer is calculated by said equation.

9. The method according to claim 8 wherein said spinning rates are ranged from 2000 rpm to 7000 rpm.

10. The method according to claim 9 wherein said thickness of said desired layer are ranged from 0.5 µm to 2.0 µm.

11. A method for estimating a property of a desired photoresist layer formed on a wafer by a spin coater comprising steps of:
    (a) forming a plurality of compared photoresist layers at a plurality of corresponding spinning rates of said spin coater;
    (b) measuring the thickness of each of said plurality of compared photoresist layers;
    (c) obtaining an equation representing the relation between said thickness of said plurality of compared photoresist layers and each corresponding spinning rate by a linear regression method; and
    (d) determining said property of said photoresist layer by means of said equation.

12. The method according to claim 11, further comprising a step (a1), before said step (a), of treating surfaces of said wafers to allow said wafers to have the same surface condition.

13. The method according to claim 11 wherein said equation is $$w = \frac{A}{t^2} + B$$

where A and B are both constants, w is said each corresponding spinning rate, and t is said thickness of said each photoresist layer.

14. The method according to claim 11 wherein said property is the thickness of said desired photoresist layer formed at a specific spinning rate.

15. The method according to claim 11 wherein said property is a specific spinning rate to form said desired photoresist layer with a desired thickness.

16. The method according to claim 11 wherein said spinning rates are ranged from 2000 rpm to 7000 rpm.

17. The method according to claim 16 wherein the thickness of said desired photoresist layer are ranged from 0.5 µm to 2.0 µm.

18. The method according to claim 17 wherein an error in estimating said property by said method is less than 1%.

* * * * *